US012772156B2

(12) United States Patent
. et al.

(10) Patent No.: US 12,772,156 B2
(45) Date of Patent: Oct. 20, 2026

(54) DYNAMIC PERIODIC ADVERTISEMENT WITH RESPONSE (PAWR) UPDATE

(71) Applicant: QUALCOMM Incorporated, San Diego, CA (US)

(72) Inventors: Robin ., Noida (IN); Sonu Lnu, Faridabad (IN); Deep Shikha Aggarwal, Gurugram (IN); Rahul Sangwan, Charkhi Dadri (IN); Maitreyi Gupta, Delhi (IN); Randhir Kumar, New Delhi (IN); Anand Mohan Singh, Ghaziabad (IN); Nicolas Graube, Cambridge (GB); Tingting Liu, Cambridge (GB); Laksh Bhatia, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/504,063

(22) Filed: Nov. 7, 2023

(65) Prior Publication Data

US 2025/0150948 A1 May 8, 2025

(51) Int. Cl.
*H04W 48/16* (2009.01)
*H04W 56/00* (2009.01)
*H04W 72/0446* (2023.01)

(52) U.S. Cl.
CPC ......... *H04W 48/16* (2013.01); *H04W 56/001* (2013.01); *H04W 72/0446* (2013.01)

(58) Field of Classification Search
CPC ............... H04W 48/16; H04W 56/001; H04W 72/0446; H04W 72/1268; H04W 72/121; H04W 84/18
USPC ....... 370/329, 458, 337, 347, 238, 321, 350, 370/348, 341, 314, 322, 431, 294
See application file for complete search history.

(56) References Cited

U.S. PATENT DOCUMENTS 6,078,819 A * 6/2000 Ciccone .................. H04M 1/73 455/574
11,743,922 B2 * 8/2023 Nagakubo ......... H04W 72/0446 370/329
11,800,499 B1 * 10/2023 Assao ............... H04W 72/0446
2014/0274192 A1 9/2014 Zhu et al.
2015/0327262 A1 * 11/2015 Kwon ............... H04W 72/0446 370/329

(Continued)

OTHER PUBLICATIONS

Bluetooth SIG Board of Directors: "Electronic Shelf Label Profile Bluetooth Profile Specification v1.0", Mar. 28, 2023, pp. 1-36, XP093100007, p. 14, line 8, paragraph 4.1—line 10 1,2, p. 23, paragraph 5.3.1.3.1.

(Continued)

*Primary Examiner* — Ricardo H Castaneyra
(74) *Attorney, Agent, or Firm* — Polsinelli

(57) ABSTRACT

Disclosed are systems and techniques for wireless communications. For example, a wireless communication device can receive, from a network device, a signal indicating a plurality of slots of time within a subevent interval for transmission of data, wherein the subevent interval is associated with a group of wireless communication devices that includes the wireless communication device. The wireless communication device can transmit one or more data packets within the plurality of slots of time.

30 Claims, 12 Drawing Sheets

(56) References Cited

U.S. PATENT DOCUMENTS

| | | | |
|---|---|---|---|
| 2021/0204302 A1 | 7/2021 | Hareuveni et al. | |
| 2024/0276304 A1* | 8/2024 | Rangineni ............. | H04W 28/18 |

OTHER PUBLICATIONS

International Search Report and Written Opinion—PCT/US2024/048454—ISA/EPO—Dec. 17, 2024.

Woolley M., "Bluetooth Core Specification Version 5.4", Feb. 7, 2023, XP093185943, pp. 1-43, p. 24, paragraph 1.2.3.4.4, 2nd bullet, p. 28 p. 28, line 1-line 2, p. 29, line 6-line 9 p. 29, paragraph 1.2.4.2.2—p. 31, figures 7, 9.

* cited by examiner

800

| Parameters 810 | PAwR_OLD 820 | PAwR_NEW 830 | Permissible range as per BLE spec 5.4 840 |
|---|---|---|---|
| Num_Subevents | 128 | 128 | 0 -128 |
| Subevent_Interval(multiple of 1.25 ms) | 10 | 20 | 6 - 255 |
| Response_Slot_Delay | 4 | 4 | 1 - 254 |
| Num_Response_Slots | 11 | 11 | 2 - 255 |
| Response_Slot_Spacing(multiple of 0.625 ms) | 1 | 2 | 1 - 255 |

FIG. 8

DYNAMIC PERIODIC ADVERTISEMENT WITH RESPONSE (PAWR) UPDATE

FIELD

The present disclosure generally relates to wireless communications. For example, aspects of the present disclosure relate to a dynamic periodic advertisement with response (PAwR) update.

BACKGROUND

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for a dynamic periodic advertisement with response (PAwR) update. According to at least one example, a wireless communication device is provided for wireless communication. The wireless communication device includes at least one memory and at least one processor coupled to the at least one memory and configured to: receive, from a network device, a signal indicating a plurality of slots of time within a subevent interval for transmission of data, wherein the subevent interval is associated with a group of wireless communication devices that includes the wireless communication device; and output one or more data packets for transmission within the plurality of slots of time.

In another illustrative example, a method of wireless communication performed at a wireless communication device is provided. The method includes: receiving, by the wireless communication device of a group of wireless communication devices from a network device, a signal indicating a plurality of slots of time within a subevent interval for transmission of data, wherein the subevent interval is associated with the group of wireless communication devices; and transmitting, by the wireless communication device, one or more data packets within the plurality of slots of time.

In another illustrative example, a non-transitory computer-readable medium of a wireless communication device having stored thereon instructions that, when executed by one or more processors, cause the one or more processors to: receive, from a network device, a signal indicating a plurality of slots of time within a subevent interval for transmission of data, wherein the subevent interval is associated with a group of wireless communication devices that includes the wireless communication device; and output one or more data packets for transmission within the plurality of slots of time In another illustrative example, a wireless communication device is provided that includes: means for receiving, from a network device, a signal indicating a plurality of slots of time within a subevent interval for transmission of data, wherein the subevent interval is associated with a group of wireless communication devices that includes the wireless communication device; and means for transmitting one or more data packets within the plurality of slots of time.

In another illustrative example, a network device is provided for wireless communication. The network device includes at least one memory and at least one processor coupled to the at least one memory and configured to: output, for transmission to a group of wireless communication devices, a signal indicating a plurality of slots of time within a subevent interval for transmission of data by a wireless communication device of the group of wireless communication devices, wherein the subevent interval is associated with the group of wireless communication devices; and receive, from the wireless communication device, one or more data packets within the plurality of slots of time.

In another illustrative example, a method of wireless communication performed at a network device is provided. The method includes: transmitting, by the network device to a group of wireless communication devices, a signal indicating a plurality of slots of time within a subevent interval for transmission of data by a wireless communication device of the group of wireless communication devices, wherein the subevent interval is associated with the group of wireless communication devices; and receiving, by the network device from the wireless communication device, one or more data packets within the plurality of slots of time.

In another illustrative example, a non-transitory computer-readable medium of a network device having stored thereon instructions that, when executed by one or more processors, cause the one or more processors to: output, for transmission to a group of wireless communication devices, a signal indicating a plurality of slots of time within a subevent interval for transmission of data by a wireless communication device of the group of wireless communication devices, wherein the subevent interval is associated with the group of wireless communication devices; and receive, from the wireless communication device, one or more data packets within the plurality of slots of time.

In another illustrative example, a network device is provided that includes: means for transmitting, to a group of wireless communication devices, a signal indicating a plurality of slots of time within a subevent interval for transmission of data by a wireless communication device of the group of wireless communication devices, wherein the subevent interval is associated with the group of wireless communication devices; and means for receiving, from the wireless communication device, one or more data packets within the plurality of slots of time.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

Illustrative aspects of the present application are described in detail below with reference to the following figures:

FIG. 8 is a table illustrating examples of permissible ranges for different PAwR parameters, in accordance with some aspects of the present disclosure.

DETAILED DESCRIPTION

Figure 1:
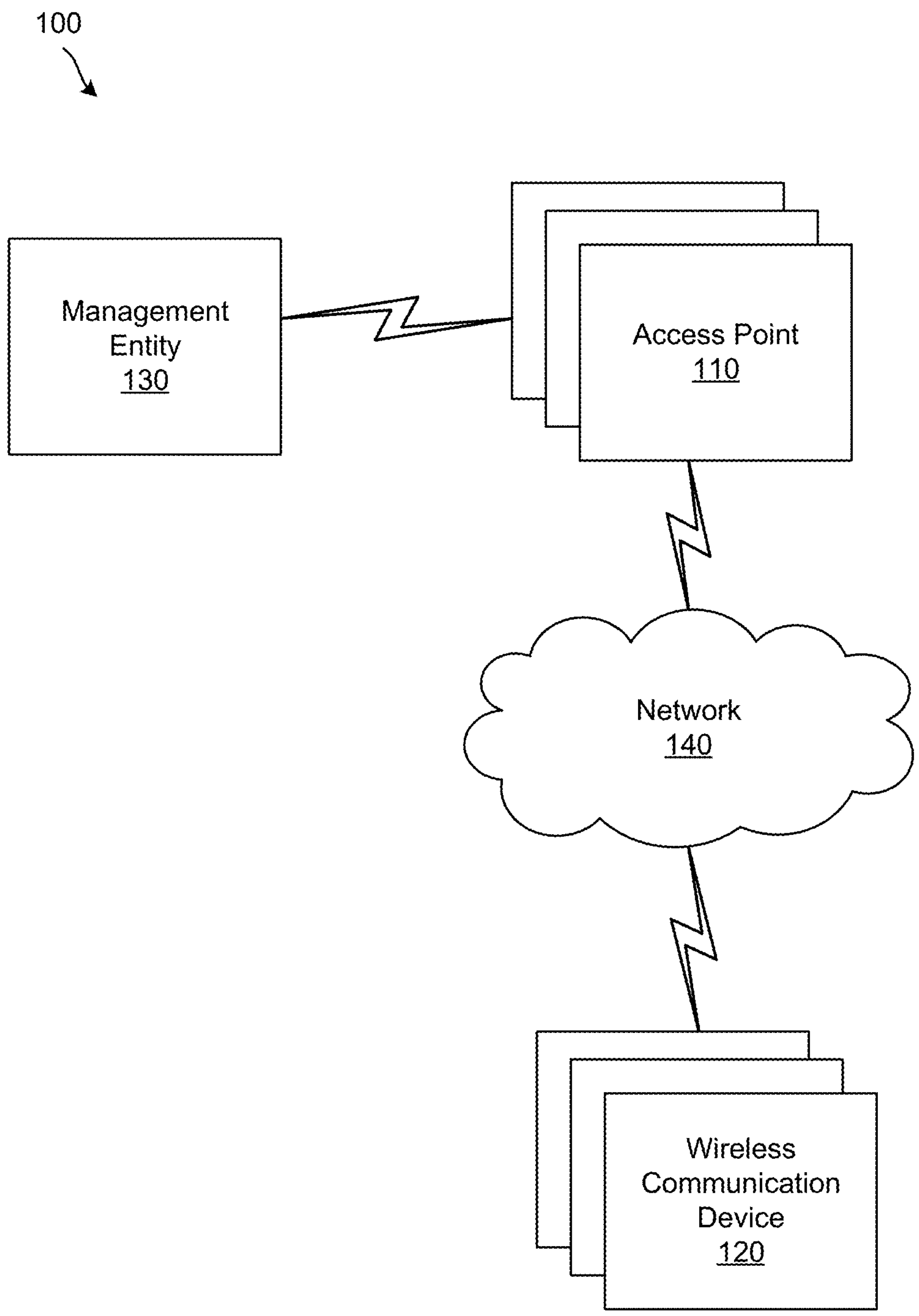
FIG. 1 is a diagram illustrating an example environment in which systems and/or methods described herein may be implemented, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

A system may include one or more wireless communication devices that are controlled by a network entity. For example, a system including multiple peripheral devices (e.g., an electronic shelf label (ESL) system) may include one or more wireless communication devices (e.g., peripheral devices, such as ESLs) that are controlled by a network entity, such as a management entity (ME), via at least one additional network entity, such as an access point (AP). As used herein, the terms “network entity” and “network device” may be interchangeable. For example, an AP can be referred to as an example of a “network entity” and/or can be referred to as an example of a “network device.” A “network entity” can include an AP, an ME, and/or a combination of the two. A “network device” can include an AP, an ME, and/or a combination of the two. In some examples, a single device can implement the functionality of an ME and an AP (e.g., an ME and an AP can be combined in a single device).

In one or more examples, to facilitate control by the ME, each peripheral device (e.g., ESL) may have a wireless connection (e.g., a BLUETOOTH® Low Energy (BLE) connection or other connection) to AP that is communicatively connected to the ME (e.g., via the Internet, such as wirelessly, via an Ethernet connection, etc.). In some cases, commands from the ME may be wirelessly transmitted to the peripheral devices (e.g., ESLs) by the AP. Responses or information from the peripheral devices may also be received by the AP and provided by the AP to the ME.

Each AP may have an associated channel map. A channel map is a listing of frequency channels to be utilized or, conversely, not to be utilized (e.g., in the context of modification of frequency hopping sequences) by an AP for communication, such as with the ESLs or other peripheral devices. While examples are described herein using ESLs as illustrative examples of wireless communication devices, a management entity as an example of a network entity, and access points as examples of network entities, the systems and techniques described herein are applicable to any type of system or network.

In ESL systems, periodic Advertisements (PAs) can be utilized to provide regular and predictable payload transmissions from a central device (e.g., which may be in the form of a network device, such as an AP) to one or more peripheral devices (e.g., which may each be in the form of a wireless communication device, such as an ESL or other peripheral device). For example, PAs can be used to issue information from a central device to multiple peripheral devices, which may be within one or more groups of peripheral devices. PAs are generally unidirectional (e.g., unidirectional transmissions) such that PAs are transmitted only one-way from a central device to one or more peripheral devices.

Periodic Advertisement with Response (PAwR) can be used for ESL systems to provide bidirectionality (e.g., bidirectional transmissions between a central device and one or more peripheral devices). Peripheral devices synchronized within a group of peripheral devices can be addressed by a central device on a synchronized channel (e.g., a radio frequency (RF) channel between the central device and the peripheral devices) whenever the central device determines to send (e.g., transmit) a request to the peripheral devices. In some cases, as used herein, a synchronized channel refers to a channel on which transmissions are synchronized (in time). For example, the channel can utilize or can be based on a frequency on which one or more communications are transmitted. A hopping frequency sequence (HFS) can be associated with the channel. In some cases, the HFS may progress at a fixed and/or pre-determined interval. In some cases, a channel map may change, such as if interference on one or more channels changes, in which case the HFS can be updated (there may not be a fixed interval). In such cases, a minimum time between updates of a HFS can be applied, which can avoid updating the HFS too frequently. A central device and one or more peripheral devices can concurrently track the sequence at a predefined frequency hopping pattern or sequence (e.g., so the central device knows when to transmit the request and the peripheral devices know when to listen for and/or receive the request).

A request transmitted by a central device to peripheral devices in a particular group may be a PA containing a synchronization message transmitted by the central device on the synchronized channel to the peripheral devices. For example, wireless communication devices within the particular group can wake up (e.g., from a low power (LP) mode) at the same PA transmission with respect to a particular PAwR train for that group. A PA is made up of a periodic set of transmissions, where the collection of transmissions is collectively referred to as a PA train or a PAwR train when applied to PAwR. Each transmission of a PA train (or PAwR train) occurs at a precise point in time, with fixed intervals between the transmissions. A communication channel (e.g., one communication channel out of thirty-seven available communication channels) is selected for each of the transmissions, where the communication channel follows a hopping frequency sequence (e.g., a hopping frequency sequence agreed upon by the central device and the peripheral devices). The synchronization between the central device and the peripheral devices in the group is based on the periodicity of the PA. The periodically-transmitted messages (e.g., the synchronization messages) include zero, one, or more commands (e.g., a respective operational code (OpCode) and parameters associated with each command). If a response from a peripheral device is expected by the central device (e.g., the synchronization message from the central device requests a response from a specific peripheral device), the particular peripheral device will respond in a specific response slot, based on where the peripheral device appeared within a sequence contained within the synchronization message transmitted by the central device.

As previously mentioned, PAwR allows BLE peripheral devices to synchronize with a central device, and to be able to respond to periodic transmissions from the central device. For scheduling of the synchronization signals and response slots, a central device generally uses statically configurable PAwR parameters, which are statically allocated at an initial time of the PAwR train. These PAwR parameters may include, but are not limited to, a number of subevent intervals in a frame of a PAwR train, the subevent interval, a response slot delay, response slot spacing, and/or a number of the response slots. The frame includes a finite set of consecutive PA transmissions. Similarly, the choice of the physical (PHY) layer (e.g., which denotes the speed of operation of the physical layer) is also static and determined by the central device when the central device initiates the PAwR train.

During the PAwR train, peripheral devices wake up, at most, during every frame of the PAwR train (and in some cases less than every frame, such as every few frames), and scan for the synchronization signal transmitted from the central device to stay synchronized with the central device. During less active periods (e.g., when the store or warehouse is closed, and no maintenance activities are scheduled), the peripheral devices will keep waking up and scanning to maintain synchronization with the central device. Static allocation of the PAwR parameters and PHY can lead to the peripheral devices being forced to scan at a frame interval, even when there is not much activity expected. This forced frequency scanning of the peripheral devices can result in suboptimal usage of resources (e.g., radio frequency resources, time resources, and power). As such, a mechanism that allows for a dynamic update (e.g., during the PAwR train) in the PAwR parameters and/or PHY without the peripheral devices losing synchronization can provide dynamic flexibility to update the PAwR parameters and/or characteristics of the PAwR train, and allow for a conservation of the resources.

In one or more aspects of the present disclosure, systems, apparatuses, methods (also referred to as processes), and computer-readable media (collectively referred to herein as "systems and techniques") are described herein that provide solutions for a dynamic PAwR update. In some aspects, systems and techniques are provided for dynamically updating PAwR characteristics of a PAwR train without the peripheral devices losing synchronization with the central device. In one or more examples, the PAwR characteristics can be dynamically updated by performing a PAwR parameter and/or PHY update, or by employing a variable response slot duration without updating the other PAwR parameters. In some examples, by using an existing synchronized channel (e.g., between the peripheral devices and the central device), the systems and techniques can provide a mechanism to dynamically update the PAwR parameters and/or PHY to enable an optimal usage of resources (e.g., power, response time, and available bandwidth).

In one or more aspects, the systems and techniques can provide dynamic flexibility for battery saving for the peripheral devices (and for the central device, in the case that the central device is battery powered), an increased payload size for the responses by the peripheral devices, a better response time, and a faster addressing. In one or more examples, the systems and techniques can allow for an increased battery life of the peripheral devices (and, in some cases, the central device) by dynamically increasing the subevent interval of the PAwR train. In some examples, the systems and techniques can allow for a larger response payload size (e.g., to be able to accommodate the transmission of large data packets) by dynamically increasing the response slot duration for one or more peripheral devices.

In one or more aspects, if during a synchronization interval, the central device wants to allocate a larger slot of time for response by one of the peripheral devices, the central device can change the response slot duration for that particular peripheral device. In one or more examples, the central device can change the response slot duration by sending an operational code (opcode) indication of a plurality of specific slots of time that can be utilized by that peripheral device to send data (e.g., including one or more data packets). After receiving this indication from the central device, the peripheral device can transmit larger data packets during these specified slots of time. The central device can align its receiver timing with the specified slots of time to receive the one or more data packets transmitted from the peripheral device.

Additional aspects of the present disclosure are described in more detail below.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable of receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or other device(s). The access point (s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
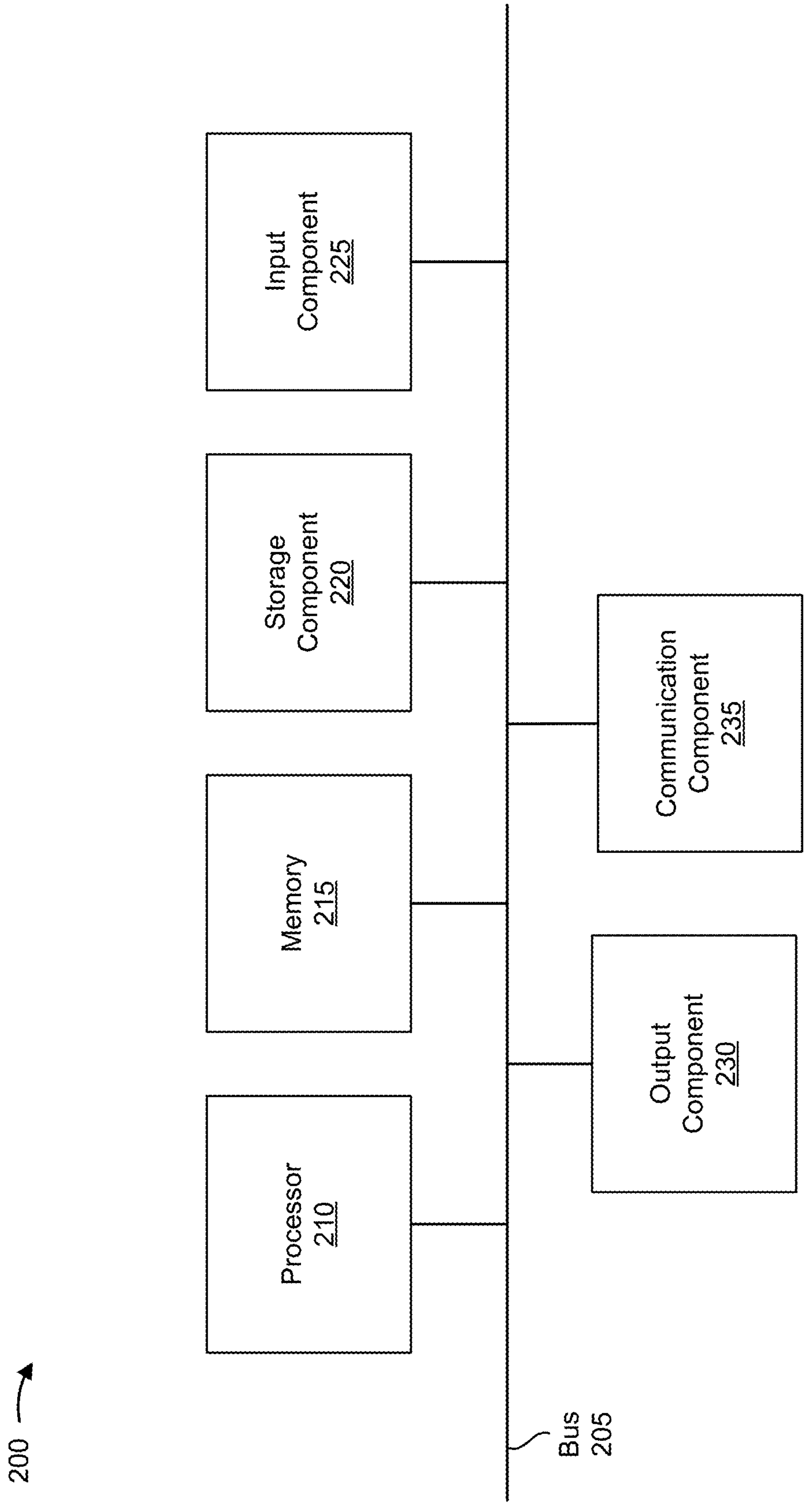
FIG. 2 is a diagram illustrating example components of a device, in accordance with some aspects of the present disclosure.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

As previously mentioned, in ESL systems, PAs are often utilized to provide regular and predictable payload transmissions from a central device (e.g., which may be in the form of a network device, such as an access point) to one or more peripheral devices (e.g., which may each be in the form of a wireless communication device, such as an ESL). PAs can be used to issue information from a central device to multiple peripheral devices, which may be within one or more groups of peripheral devices. PAs are generally unidirectional (e.g., unidirectional transmissions) such that PAs are transmitted only one-way from a central device to one or more peripheral devices.

Periodic Advertisement with Response (PAwR) was introduced to ESL systems to provide bidirectionality (e.g., bidirectional transmissions between a central device and one or more peripheral devices). Peripheral devices synchronized within a group of peripheral devices can be addressed by a central device on a synchronized channel (e.g., a synchronized frequency channel between the central device and the peripheral devices) whenever the central device determines to send (e.g., transmit) a request (e.g., a PA containing a synchronization message transmitted on the synchronized channel) to the peripheral devices. If a response from a peripheral device is expected by the central device (e.g., the synchronization message from the central device requests a response from a specific peripheral device), the particular peripheral device will respond in a specific response slot, based on where the peripheral device appeared within a sequence contained within the synchronization message transmitted by the central device.

Figure 3:
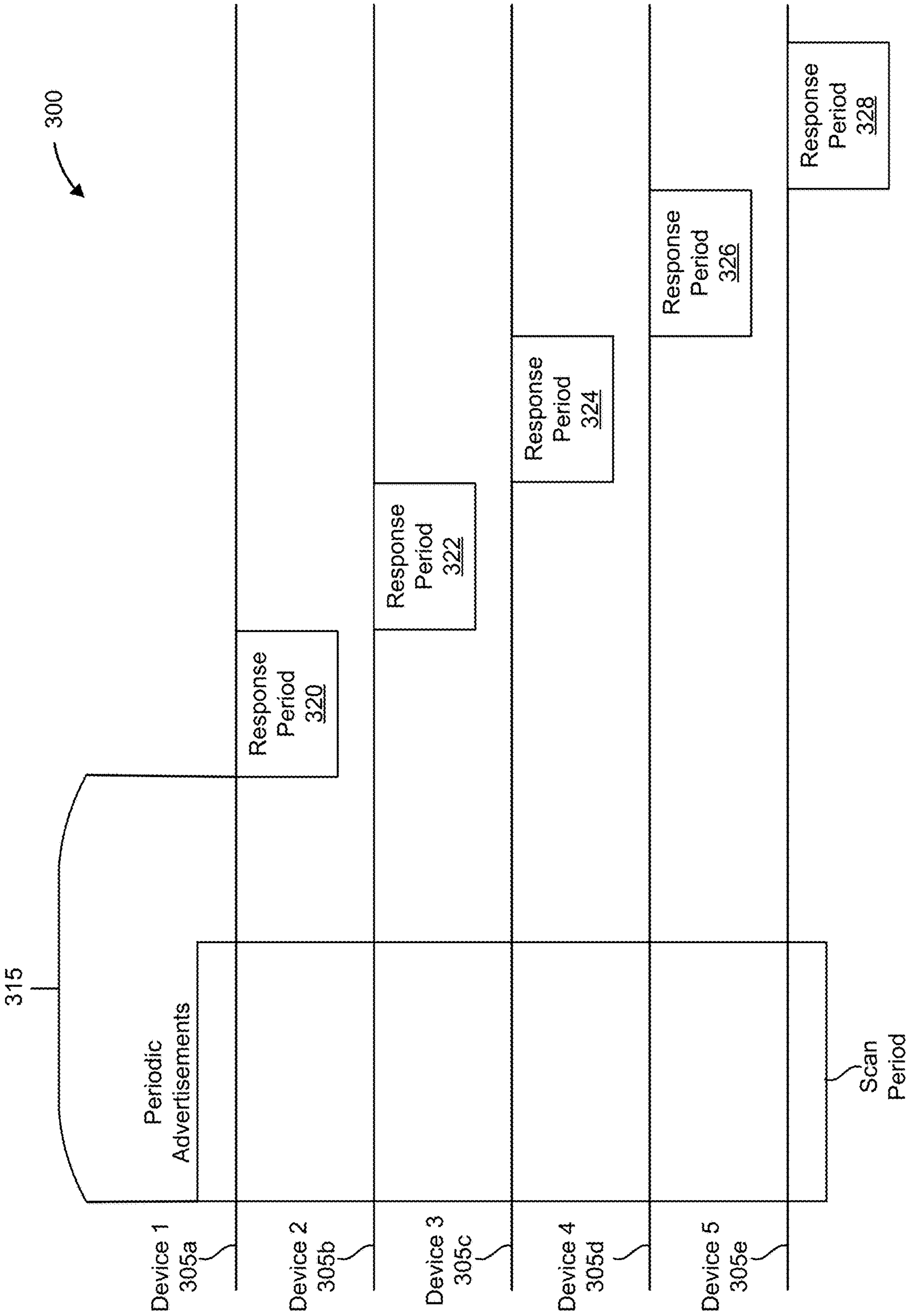
FIG. 3 is a signaling diagram illustrating example communication transmissions, in accordance with some aspects of the present disclosure.
Figure 4:
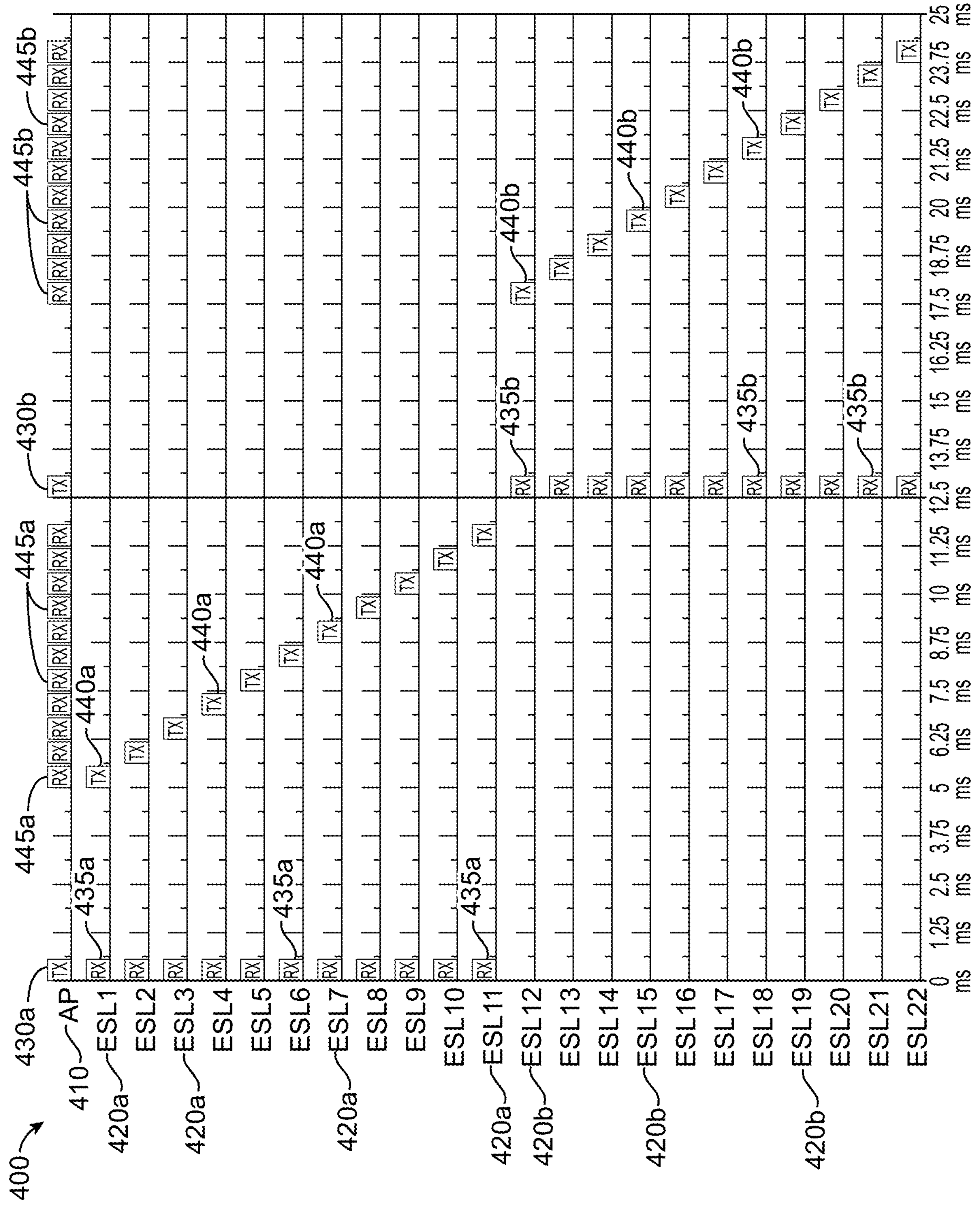
FIG. 4 is a signaling diagram illustrating an example of communication transmissions between a network device and two groups of wireless communication devices, in accordance with some aspects of the present disclosure.

FIGS. 3 and 4 show signaling diagrams illustrating examples of PAwR in an ESL system. In particular, the signaling diagram of FIG. 3 shows an example PAwR for a group of wireless network devices (e.g., device 1 305*a*, device 2 305*b*, device 3 305*c*, device 4 305*d*, and device 5 305*e*), and the signaling diagram of FIG. 4 shows an example PAwR for two groups of wireless network devices 420*a*, 420*b* (e.g., a first group including ESL1 to ESL 11, and a second group including ESL 12 to ESL 22). Specifically, FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305*a*, device 2 305*b*, device 3 305*c*, device 4 305*d*, and device 5 305*e*) of FIG. 3 may be selected from wireless communication devices 120 of FIG. 1, and may each receive a periodic advertisement (PA) in a scan period 310. The scan period 310 may occur in regularly scheduled intervals and may be repeated periodically such that the devices (e.g., device 1 305*a*, device 2 305*b*, device 3 305*c*, device 4 305*d*, and device 5 305*e*) can awaken to scan for messages during this repeated scan period 310. An access point (e.g., access point 110 of FIG. 1) may provide periodic advertisements (PAs) via broadcast or multi-cast to the devices (e.g., device 1 305*a*, device 2 305*b*, device 3 305*c*, device 4 305*d*, and device 5 305*e*) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305*a*, device 2 305*b*, device 3 305*c*, device 4 305*d*, and device 5 305*e*). The devices (e.g., device 1 305*a*, device 2 305*b*, device 3 305*c*, device 4 305*d*, and device 5 305*e*) may decode or filter the messages intended for each specific device and transmitted during the period when all devices are receiving. In this way, the devices (e.g., device 1 305*a*, device 2 305*b*, device 3 305*c*, device 4 305*d*, and device 5 305*e*) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305*a*, device 2 305*b*, device 3 305*c*, device 4 305*d*, and device 5 305*e*).

As illustrated, the devices (e.g., device 1 305*a*, device 2 305*b*, device 3 305*c*, device 4 305*d*, and device 5 305*e*) are each assigned a response period 320, 322, 324, 326, 328 in the time after the scan period 310. In some cases, the assignment of the response period to a particular device may not be permanent. In some aspects, the assignment may be inferred from a payload of a synchronization message. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305*a* is assigned response period 320, device 2 305*b* is assigned response period 322, device 3 305*c* is assigned response period 324, device 4 305*d* is assigned response period 326, and device 5 305*e* is assigned response period 328. The access point (e.g., access point 110 of FIG. 1) may store attributes of the devices (e.g., device 1 305*a*, device 2 305*b*, device 3 305*c*, device 4 305*d*, and device 5 305*e*), including whether a device is able to transmit or respond. The PA signaling followed by responses can be referred to as periodic advertisement with multiple responses (PAwMR).

For example, device 3 305*c* (e.g., wireless communication device 120 of FIG. 1) may be an ESL and may receive a price update in a PA from the access point (e.g., access point 110 of FIG. 1) in scan period 310. The PA received at device 3 305*c* may include a designated start time for the response period 324 or may include a schedule of response start times for devices including device 3 305*c*. The response by device 3 305*c* to the access point (e.g., access point 110 of FIG. 1) may include an acknowledgement, a status code, and/or other information such as battery life, received signal strength, and/or an error notification. The response by device 3 305*c* may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305*a*, device 2 305*b*, device 3 305*c*, device 4 305*d*, and device 5 305*e*) may use channels of the Bluetooth protocol.

A device (e.g., device 5 305*e*) that has been assigned a response period may not respond and may determine that it has nothing to signal. In other words, the devices (e.g., device 1 305*a*, device 2 305*b*, device 3 305*c*, device 4 305*d*, and device 5 305*e*) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertisement channels in Bluetooth.

As previously mentioned, FIG. 4 shows an example PAwR for two groups of wireless network devices 420*a*, 420*b* (e.g., a first group including ESL1 to ESL 11, and a second group including ESL 12 to ESL 22). In particular, FIG. 4 is a signaling diagram illustrating an example of communication transmissions 400 between a network device 410 (e.g., a central device, which may be an access point) and two groups of wireless communication devices 420*a*, 420*b* (e.g., peripheral devices, which may be ESLs). With reference to FIG. 1, the signal sequence illustrated in FIG. 4 may be implemented by one or more of the communication connections, access points 110, and/or wireless communication devices 120 of FIG. 1.

In FIG. 4, the signaling diagram is shown in the form of a graph with an x-axis denoting time in milliseconds (ms) and a y-axis denoting specific wireless communication devices 420*a*, 420*b* (e.g., ESL1, ESL 2, ESL 3, ESL 4, ESL 5, ESL 6, ESL 7, ESL 8, ESL 9, ESL 10, ESL 11, ESL 12, ESL 13, ESL 14, ESL 15, ESL 16, ESL 17, ESL 18, ESL 19, ESL 20, ESL 21, and ESL 22). In particular, the x-axis of the graph of FIG. 4 denotes time starting from 0 ms and ending at 25 ms. The time can be divided into two subframes, which are each a length of 12.5 ms. As such, the two subframes may include a first subframe from 0 ms to 12.5 ms, and a second subframe from 12.5 ms to 25 ms. In one or more examples, there may be more or less than two subframes as is shown in FIG. 4, and/or each subframe may be longer or shorter than 12.5 ms as shown in FIG. 4.

In one or more examples, the wireless communication devices 420*a*, 420*b* (e.g., peripheral devices) may be assigned (e.g., by the network device 410 and/or by a network entity, such as a management entity) to different groups (e.g., two groups) of wireless communication devices 420*a*, 420*b*. For example, wireless communication devices 420*a* (e.g., ESL1, ESL 2, ESL 3, ESL 4, ESL 5, ESL 6, ESL 7, ESL 8, ESL 9, ESL 10, and ESL 11) may be assigned to a first group (e.g., group 1), and wireless communication devices 420*b* (e.g., ESL 12, ESL 13, ESL 14, ESL 15, ESL 16, ESL 17, ESL 18, ESL 19, ESL 20, ESL 21, and ESL 22) may be assigned to second group (e.g., group 2).

In FIG. 4, during operation for PAwR, at time 0 ms for the first subframe of time, the network device 410 (e.g., a central, such as an AP) may transmit 430*a* to a first group (e.g., group 1) of wireless communication devices 420*a* (e.g., ESL 1, ESL 2, ESL 3, ESL 4, ESL 5, ESL 6, ESL 7, ESL 8, ESL 9, ESL 10, and ESL 11) a PA containing a synchronization message (e.g., an AP synchronization message) over a synchronized channel between the network device 410 and the wireless communication devices 420*a*, 420*b*. As noted previously, a synchronization message can include one or more commands. For instance, a command can identified by an operational code (OpCode) and parameters associated with the command. At time 0 ms, the first group of wireless communication devices 420*a* (e.g., ESL 1, ESL 2, ESL 3, ESL 4, ESL 5, ESL 6, ESL 7, ESL 8, ESL 9, ESL 10, and ESL 11) can receive 435*a* the PA containing the synchronization message over the synchronized channel.

In one or more examples, the network device 410 may be configured to transmit PAs at a specified time interval (e.g., a subframe of time), such as at every 12.5 ms as is shown in FIG. 4. In one or more examples, the specified time interval (e.g., a subframe) may be shorter or longer than the 12.5 ms as is shown in FIG. 4. The wireless communication devices 420*a*, 420*b* may respond to a PA by using their specific respective response slot in time.

In one or more examples, the synchronization message transmitted 430*a* to the first group (e.g., group 1) of wireless communication devices 420*a* (e.g., ESL 1, ESL 2, ESL 3, ESL 4, ESL 5, ESL 6, ESL 7, ESL 8, ESL 9, ESL 10, and ESL 11) may indicate a respective response slot for one or more of the wireless communication devices 420*a* (e.g., ESL 1, ESL 2, ESL 3, ESL 4, ESL 5, ESL 6, ESL 7, ESL 8, ESL 9, ESL 10, and/or ESL 11) in the first group to use to transmit 440*a* a response to the network device 410. If a wireless communication device 420*a* (e.g., ESL 1, ESL 2, ESL 3, ESL 4, ESL 5, ESL 6, ESL 7, ESL 8, ESL 9, ESL 10, and ESL 11) is addressed within the synchronization message, the wireless communication device 420*a* (e.g., ESL 1, ESL 2, ESL 3, ESL 4, ESL 5, ESL 6, ESL 7, ESL 8, ESL 9, ESL 10, and ESL 11) can respond (e.g., transmit 440*a*) in its respective response slot, as indicated within the synchronization message.

For example, the synchronization message may indicate a specific sequence for one or more of the wireless communication devices 420*a* (e.g., ESL 1, ESL 2, ESL 3, ESL 4, ESL 5, ESL 6, ESL 7, ESL 8, ESL 9, ESL 10, and/or ESL 11) to respond (e.g., transmit 440*a*) in time (e.g., responding after 5 ms has elapsed after the start of the subframe at response slots located every 0.625 ms). For example, the sequence may indicate that wireless communication device 420*a* (e.g., ESL 1) should respond in a response slot located at 5 ms, wireless communication device 420*a* (e.g., ESL 2) should respond in a response slot located at 5.625 ms, wireless communication device 420*a* (e.g., ESL 3) should respond in a response slot located at 6.25 ms, wireless communication device 420*a* (e.g., ESL 4) should respond in a response slot located at 6.875 ms, wireless communication device 420*a* (e.g., ESL 5) should respond in a response slot located at 7.5 ms, wireless communication device 420*a* (e.g., ESL 6) should respond in a response slot located at 8.125 ms, wireless communication device 420*a* (e.g., ESL 7) should respond in a response slot located at 8.75 ms, wireless communication device 420*a* (e.g., ESL 8) should respond in a response slot located at 9.375 ms, wireless communication device 420*a* (e.g., ESL 9) should respond in a response slot located at 10 ms, wireless communication device 420*a* (e.g., ESL 10) should respond in a response slot located at 10.625 ms, and wireless communication device 420*a* (e.g., ESL 11) should respond in a response slot located at 11.25 ms.

After the wireless communication devices 420*a* (e.g., ESL 1, ESL 2, ESL 3, ESL 4, ESL 5, ESL 6, ESL 7, ESL 8, ESL 9, ESL 10, and ESL 11) have received 435*a* the PA containing the synchronization message from the network device 410, according to the sequence specified within the synchronization message, the one or more wireless communication devices 420*a* (e.g., ESL 1, ESL 2, ESL 3, ESL 4, ESL 5, ESL 6, ESL 7, ESL 8, ESL 9, ESL 10, and/or ESL 11) can transmit 440*a* their responses within their respective response slots. After the one or more wireless communication devices 420*a* (e.g., ESL 1, ESL 2, ESL 3, ESL 4, ESL 5, ESL 6, ESL 7, ESL 8, ESL 9, ESL 10, and/or ESL 11) have transmitted 440*a* their responses in their respective response time slots, the network device 410 can receive 445*a* their transmitted responses at those specific response slot times.

During operation for PAwR, at time 12.5 ms for the second subframe of time, the network device 410 may transmit 430*b* to a second group (e.g., group 2) of wireless communication devices 420*b* (e.g., ESL 12, ESL 13, ESL 14, ESL 15, ESL 16, ESL 17, ESL 18, ESL 19, ESL 20, ESL 21, and ESL 22) a PA containing a synchronization message over a synchronized channel between the network device 410 and the wireless communication devices 420*a*, 420*b*. In addition, at time 12.5 ms, the second group of wireless communication devices 420*b* (e.g., ESL 12, ESL 13, ESL 14, ESL 15, ESL 16, ESL 17, ESL 18, ESL 19, ESL 20, ESL 21, and ESL 22) can receive 435*b* the PA containing the synchronization message over the synchronized channel.

The synchronization message transmitted 430*b* to the second group (e.g., group 2) of wireless communication devices 420*b* (e.g., ESL 12, ESL 13, ESL 14, ESL 15, ESL 16, ESL 17, ESL 18, ESL 19, ESL 20, ESL 21, and ESL 22) may indicate a respective response slot for one or more of the wireless communication devices 420*b* (e.g., ESL 12, ESL 13, ESL 14, ESL 15, ESL 16, ESL 17, ESL 18, ESL 19, ESL 20, ESL 21, and/or ESL 22) in the second group to use to transmit **440*b* a response to the network device 410. If a wireless communication device 420*b* (e.g., ESL 12, ESL 13, ESL 14, ESL 15, ESL 16, ESL 17, ESL 18, ESL 19, ESL 20, ESL 21, and ESL 22) is addressed within the synchronization message, the wireless communication device 420*b* (e.g., ESL 12, ESL 13, ESL 14, ESL 15, ESL 16, ESL 17, ESL 18, ESL 19, ESL 20, ESL 21, and ESL 22) can respond (e.g., transmit 440*b***) in its respective response slot, as indicated within the synchronization message.

For example, the synchronization message may indicate a specific sequence for one or more of the wireless communication devices **420*b* (e.g., ESL 12, ESL 13, ESL 14, ESL 15, ESL 16, ESL 17, ESL 18, ESL 19, ESL 20, ESL 21, and/or ESL 22) to respond (e.g., transmit 440*b*) in time (e.g., responding after 5 ms has elapsed after the start of the subframe at response slots located every 0.625 ms). For example, the sequence may indicate that wireless communication device 420*b* (e.g., ESL 12) should respond in a response slot located at 17.5 ms, wireless communication device 420*b* (e.g., ESL 13) should respond in a response slot located at 18.125 ms, wireless communication device 420*b* (e.g., ESL 14) should respond in a response slot located at 18.75 ms, wireless communication device 420*b* (e.g., ESL 15) should respond in a response slot located at 19.375 ms, wireless communication device 420*b* (e.g., ESL 16) should respond in a response slot located at 20 ms, wireless communication device 420*b* (e.g., ESL 17) should respond in a response slot located at 20.625 ms, wireless communication device 420*b* (e.g., ESL 18) should respond in a response slot located at 21.25 ms, wireless communication device 420*b* (e.g., ESL 19) should respond in a response slot located at 21.875 ms, wireless communication device 420*b* (e.g., ESL 20) should respond in a response slot located at 22.5 ms, wireless communication device 420*b* (e.g., ESL 21) should respond in a response slot located at 23.125 ms, and wireless communication device 420*b* (e.g., ESL 22**) should respond in a response slot located at 23.75 ms.

After the wireless communication devices **420*b* (e.g., ESL 12, ESL 13, ESL 14, ESL 15, ESL 16, ESL 17, ESL 18, ESL 19, ESL 20, ESL 21, and ESL 22) have received 435*b* the PA containing the synchronization message from the network device 410, according to the sequence specified within the synchronization message, the one or more wireless communication devices 420*b* (e.g., ESL 12, ESL 13, ESL 14, ESL 15, ESL 16, ESL 17, ESL 18, ESL 19, ESL 20, ESL 21, and/or ESL 22) may transmit 440*b* their responses within their respective response slots. After the one or more wireless communication devices 420*b* (e.g., ESL 12, ESL 13, ESL 14, ESL 15, ESL 16, ESL 17, ESL 18, ESL 19, ESL 20, ESL 21, and/or ESL 22) have transmitted 440*b* their responses in their respective response time slots, the network device 410 can receive 445*b*** their transmitted responses at those specific response slot times. The PAwR may continue similarly for subsequent subframes of time.

As previously mentioned, PAwR allows BLE peripheral devices to synchronize with a central device, and to be able to respond to periodic transmissions from the central device. For scheduling of the synchronization signals and response slots, a central device generally utilizes statically configurable PAwR parameters (e.g., which are statically allocated at an initial time of the PAwR train). These PAwR parameters may include, but are not limited to, a number of subevent intervals in a frame of a PAwR train (e.g., a total number of subevents in a single frame), the subevent interval (e.g., a time duration between two consecutive subevents within a frame), a response slot delay (e.g., a time between a start of an advertising packet at the start of a subevent and a start of a first response slot), response slot spacing (e.g., a time between two consecutive response slots), and/or a number of the response slots (e.g., a number of response slots within a subevent of a frame). Similar to the PAwR parameters, the choice of the physical (PHY) layer (e.g., which denotes the speed of operation of the physical layer, for example PHY 1 is one megabits per second and PHY 2 is two megabits per second of speed), is also static and determined by the central device, when the central device initiates the PAwR train.

Figure 5:
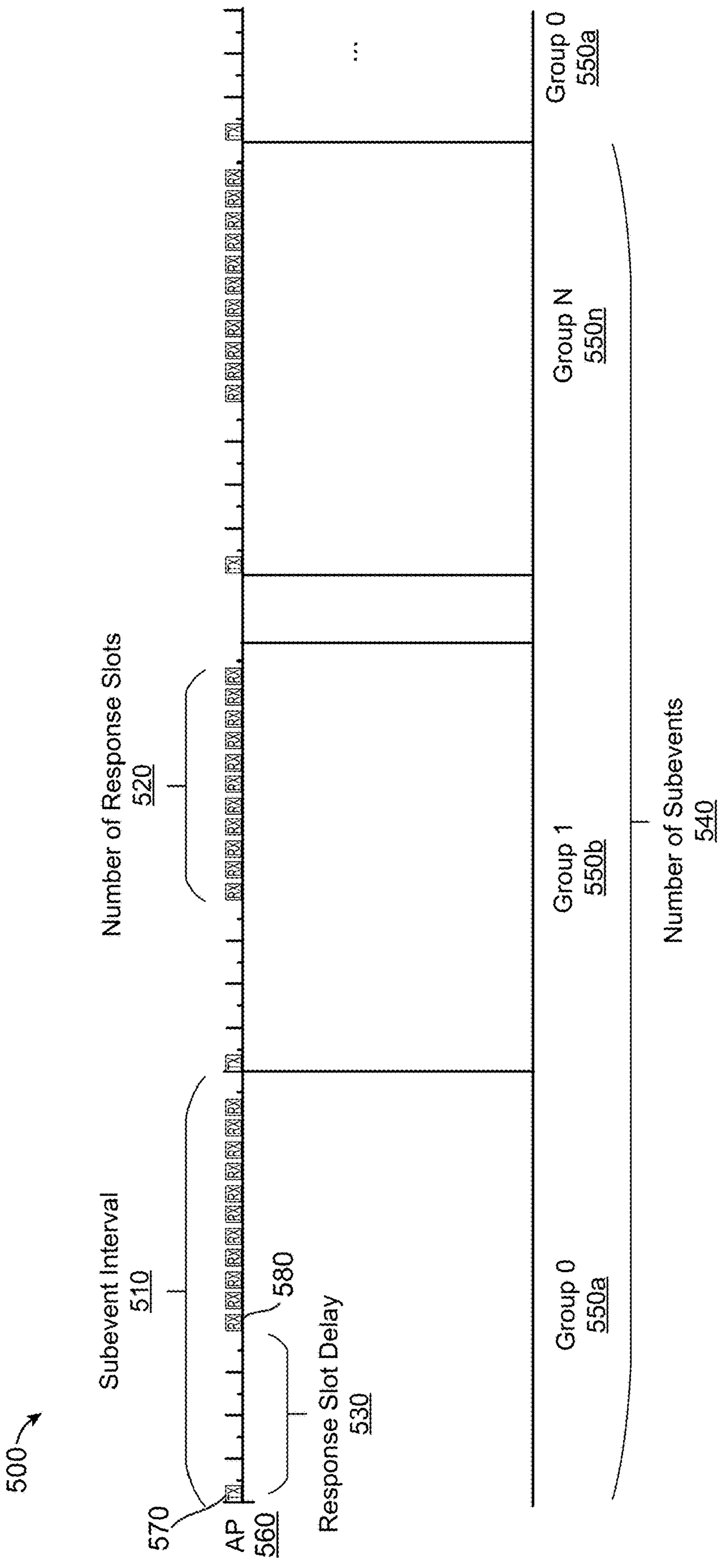
FIG. 5 is a diagram illustrating an example of a periodic advertisement with responses (PAwR) train, in accordance with some aspects of the present disclosure.

During the PAwR train, peripheral devices wake up during every frame (or during a subset of frames) of the PAwR train, and scan for the synchronization signal transmitted from the central device to stay synchronized with the central device. FIG. 5 is a diagram illustrating an example of a PAwR train 500 (e.g., where there is a static allocation of the PAwR parameters). In FIG. 5, the PAwR train 500 is shown to be divided into multiple subevent intervals 510, where there is a total number of subevents 540 (e.g., a total number of subevent intervals) within a frame of the PAwR train 500. In FIG. 5, the x-axis denotes time.

In one or more examples, a plurality of wireless communication devices (e.g., peripheral devices, such as in the form of ESLs) are divided into a plurality of groups, where each subevent interval 510 of a frame is associated with a different group of wireless communication devices. For example, in FIG. 5, the first subevent interval 510 is associated with Group 0 **550*a* of wireless communication devices, the second subevent interval 510 is associated with Group 1 550*b* of wireless communication devices, . . . , and the Nth subevent interval 510 is associated with Group N 550*n*** of wireless communication devices.

During the PAwR train 500, during the first subevent interval 510, a network device 560 (e.g., a central device, such as an access point) transmits (e.g., broadcasts) a synchronization signal 570 to the wireless communication devices in Group 0 **550*a*. The wireless communication devices in Group 0 550*a* are listening (e.g., configured to receive) for transmissions from the network device 560 to keep in synchronization with the network device 560 and to accept messages from the network device 560. After receiving the synchronization signal 570 from the network device 560, the wireless communication devices in Group 0 550*a* send (e.g., transmit) responses within their respective response slots 520 of time within the first subevent interval 510. The first response slot 580 of the response slots 520 (e.g., within the first subevent interval 510) begins after a response slot delay 530 of time after the synchronization signal 570 is sent by the network device 560. This process then repeats for the wireless communication devices in the remaining groups (e.g., Group 1 550*b*, . . . , and Group N 550*n*) for their respective subevent intervals 510 for the frame of the PAwR train 500. The process then subsequently repeats for each of the subsequent frames of the PAwR train 500**.

During less active periods (e.g., when the store or warehouse containing the wireless communication devices is closed, and no maintenance activities are scheduled), the wireless communication devices (e.g., ESLs) will continue to wake up and scan within each frame of the PAwR train 500 to maintain synchronization with the network device 560. Static allocation of the PAwR parameters and PHY can lead to the wireless communication devices being forced to scan at a frame interval, even when there is not much activity expected. This forced frequency scanning of the wireless communication devices can lead to suboptimal usage of resources (e.g., radio frequency resources, time resources, and power). As such, a mechanism that allows for a dynamic update (e.g., during the PAwR train 500) in the PAwR parameters and/or PHY without the wireless communication devices losing synchronization with the network device 560 can provide dynamic flexibility to update the PAwR parameters and/or characteristics of the PAwR train 500, and allow for a conservation of the resources.

In one or more aspects, the systems and techniques provide solutions for a dynamic PAwR update. In some examples, the systems and techniques allow for dynamically updating PAwR characteristics of a PAwR train without the peripheral devices (e.g., wireless communication devices, such as ESLs) losing synchronization with the central device (e.g., a network device, such as an access point). In one or more examples, the PAwR characteristics may be dynamically updated by performing a PAwR parameter and/or PHY update, or by utilizing a variable response slot duration without updating the other PAwR parameters. In some examples, by using an existing synchronized channel (e.g., between the peripheral devices and the central device), the systems and techniques can provide a mechanism to dynamically update the PAwR parameters and/or PHY to enable an optimal usage of resources (e.g., power, response time, and available bandwidth).

In one or more aspects, the systems and techniques can provide dynamic flexibility for saving battery power for the peripheral devices (and for the central device, in the case that the central device is battery powered), an increased payload size for the responses by the peripheral devices, a better response time, and a faster addressing. In one or more examples, the systems and techniques can allow for an increased battery life of the peripheral devices (and, in some cases, the central device) by dynamically increasing the subevent interval of the PAwR train.

In one or more aspects, a network device (e.g., a central device or PAwR advertiser, such as an access point) can dynamically (e.g., during a PAwR train) update the PAwR parameters or the PHY by sending (e.g., transmitting) to wireless communication devices a parameter update data indication of the new PAwR parameters or PHY within a signal, such as a synchronization signal, for example an AUX_SYNC_subevent_IND protocol data unit (PDU). The signal may also include an indication of an instant in time (e.g., expressed as a future periodic advertisement (PA) event counter value, as an absolute time such as supplied through Generic Attribute Profile (GATT), or other indication), for when the new PAwR parameters or PHY should be applied by the wireless communication devices and the network device. In one or more examples, the network device (e.g., access point) can send (e.g., transmit) the signal (including the parameter update data indication and the instant) a plurality of times (e.g., six times) to the wireless communication devices to ensure that all of the wireless communication devices receive the signal.

After the wireless communication devices (e.g., ESLs) receive the signal from the network device (e.g., access point), when the instant in time (e.g., the PA event counter value) occurs, the wireless communication devices can align their timing (e.g., PAwR train timing) with the indicated new PAwR parameters or PHY. In one or more examples, after the instant in time (e.g., PA event counter value) occurs, the network device (e.g., access point) can send (e.g., transmit) a query message (e.g., a ping) (e.g., sent according to timing of the PA train) to the wireless communication devices to determine the success (e.g., or miss) rate for the update operation (e.g., to determine how many wireless communication devices of the total number of wireless communication devices were able to successfully update to the new PAwR parameters or PHY).

In one or more aspects, in case a decrease in the number of subevent intervals (e.g., subevent interval 510 of FIG. 5) within a frame of a PA train (e.g., PA train 500 of FIG. 5) is desired, a network device (e.g., a central device or advertiser, such as an access point) can first ensure that no wireless communication devices (e.g., peripheral devices, such as ESLs) exist on the subevent intervals that are to be omitted (e.g., removed). In one or more examples, the network device (e.g., access point) may allocate more wireless communication devices (e.g., ESLs) to the earlier subevent intervals (e.g., to fill up the earlier subevent intervals). For example, the network device may move wireless communication devices from the later subevent intervals, which will be omitted, to the earlier subevent intervals, which will remain. As such, with the movement of the wireless communication devices to the earlier subevent intervals and the removal of the later subevent intervals, there will be an increase in the number of wireless communication devices within each subevent interval.

Figure 6:
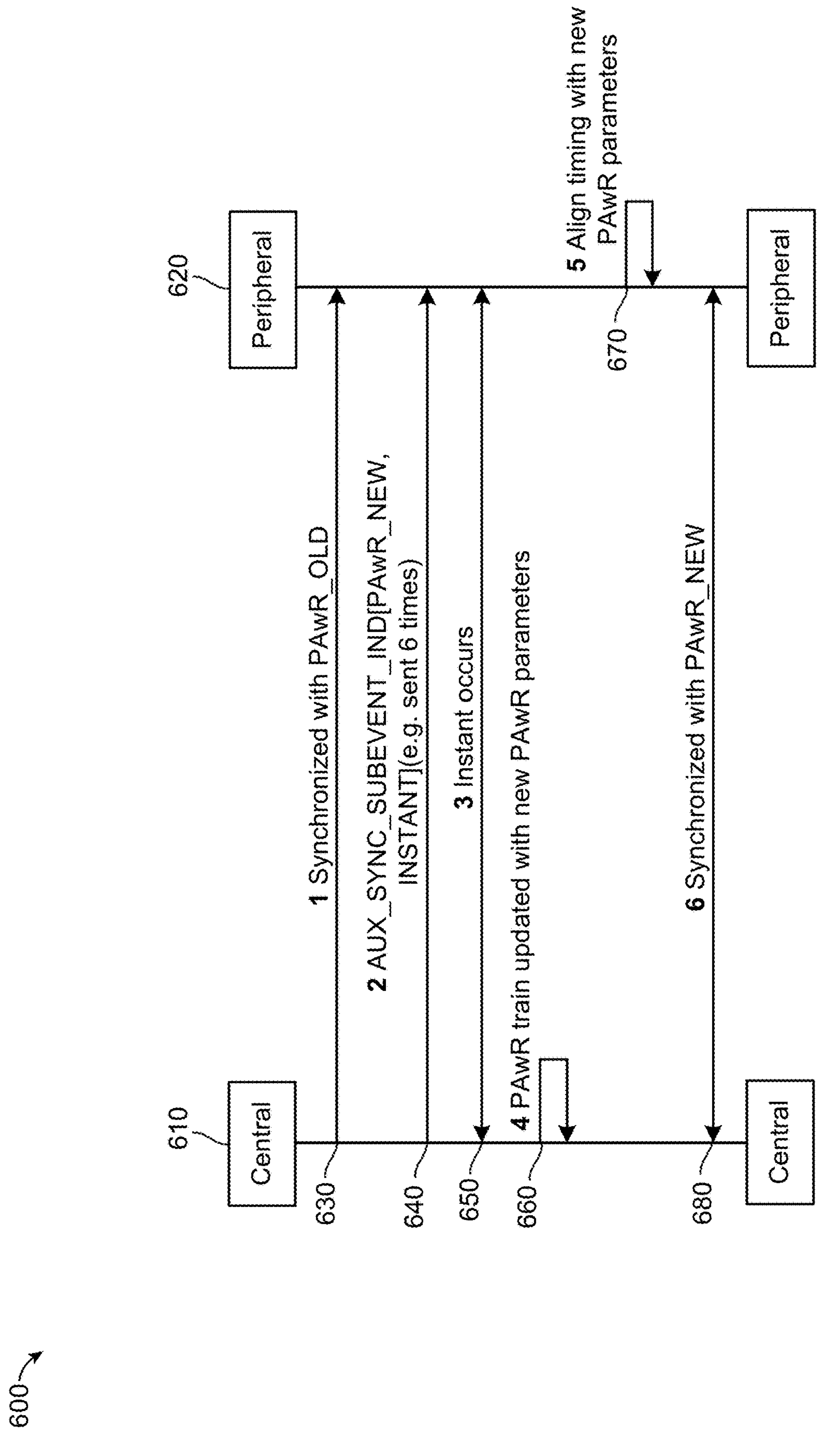
FIG. 6 is a diagram illustrating an example of signaling for a dynamic PAwR parameter or physical (PHY) layer update, in accordance with some aspects of the present disclosure.

FIG. 6 is a diagram illustrating an example of signaling 600 for a dynamic PAwR parameter or physical (PHY) layer update. In FIG. 6, a central 610 (e.g., a network device, such as an access point) and a peripheral 620 (e.g., a wireless communication device, such as an ESL) are shown. During operation of the signaling 600, the central 610 and the peripheral 620 are synchronized with each other with old PAwR parameters (PAwR_OLD) 630. The central 610 then sends, for a plurality of times (e.g., six times), a signal (e.g., an AUX_SYNC_SUBEVENT_IND PDU) to the peripheral 620, where the signal includes an indication of the new PAwR parameters (PAwR_NEW) and the instant in time 640 that the new PAwR parameters are to be applied. At the time that the instant occurs 650, the central 610 updates the PAwR train with the new PAwR parameters 660 and the peripheral 620 aligns its timing (e.g., receiving timing) with the new PAwR parameters 670. The central 610 and the peripheral 620 are then synchronized with each other with the new PAwR parameters (PAwR_NEW) 680.

Figure 7:
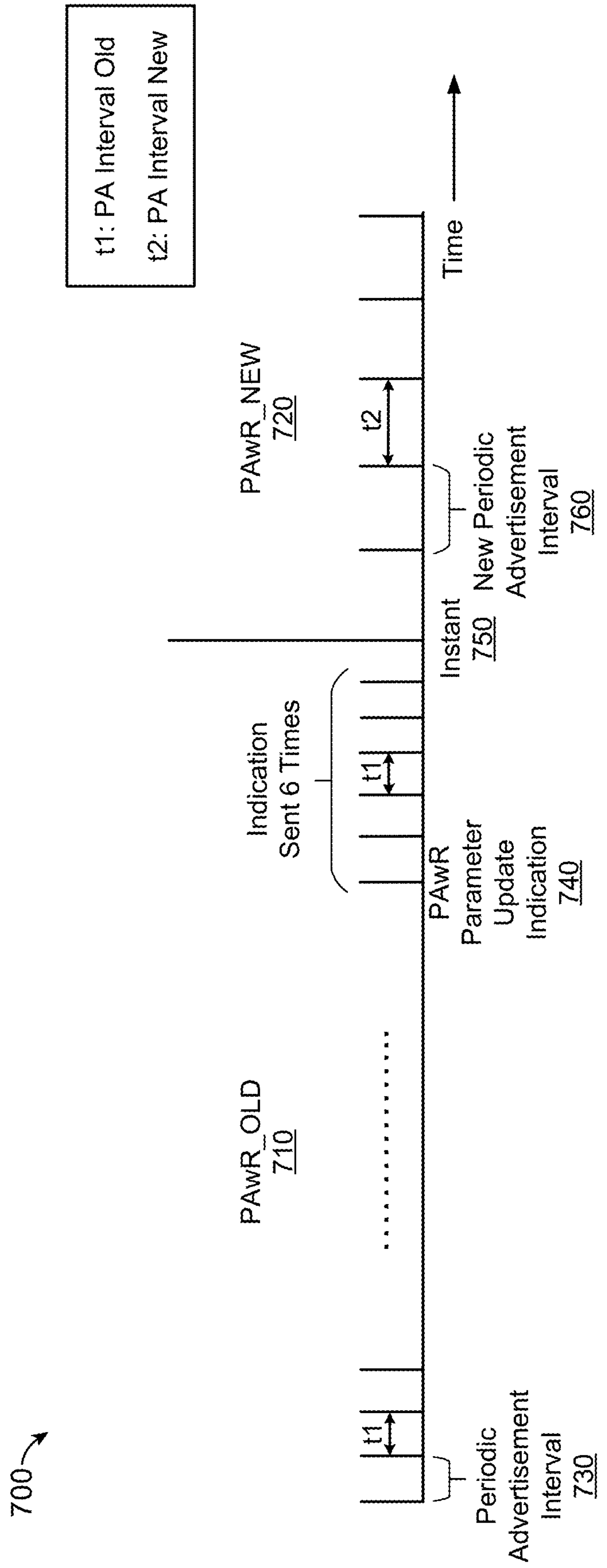
FIG. 7 is a diagram illustrating an example of transmissions by a network device for a PAwR parameter or PHY layer update, in accordance with some aspects of the present disclosure.

FIG. 7 is a diagram illustrating an example of transmissions 700 by a network device (e.g., a central device, such as an access point) for a PAwR parameter or PHY layer update. In particular, FIG. 7 shows an example of how the periodic advertisement interval can be updated with the application of new PAwR parameters. In FIG. 7, the x-axis denotes time.

In FIG. 7, during the PAwR, according to old PAwR parameters 710 (PAwR_OLD), the network device can transmit (e.g., broadcast) a periodic advertisement (e.g., a synchronization signal) to wireless communication devices (e.g., peripheral devices, such as ESLs) at each periodic advertisement interval 730, which can have a spacing duration of time t1. For an update of the PAwR parameters, the network device can transmit (e.g., broadcast), for a plurality of times (e.g., six times, which may be separated with a duration of the time t1), to the wireless communication devices a signal (e.g., an AUX_SYNC_SUBEVENT_IND PDU) including a PAwR parameter update indication 740. The PAwR parameter update indication 740 can include an indication of the new PAwR parameters 720 (PAwR_NEW) and the instant in time that the new PAwR parameters are to be applied.

After the time that the instant 750 occurs, the network device can update the PAwR train with the new PAwR parameters 720 and the wireless communication devices can align their timing (e.g., receiving timing) with the new PAwR parameters 720. The network device and the wireless communication devices are then synchronized with each other with the new PAwR parameters 720 (PAwR_NEW). According to the new PAwR parameters 720 (PAwR_NEW), the network device can send (e.g., transmit) a periodic advertisement (e.g., a synchronization signal) to the wireless communication devices at each periodic advertisement interval 760, which can have a spacing duration of time t2 (e.g., which may be longer in duration than the time t1).

FIG. 8 is a table 800 illustrating examples of permissible ranges for different PAwR parameters. In FIG. 8, the table 800 is shown to include a PAwR parameters column 810, an old PAwR parameters (PAwR_OLD) column 820, a new PAwR parameters (PAwR_NEW) column 830, and a permissible range (e.g., as per BLE specification 5.4) column 840. The PAwR parameters column 810 lists the different types of PAwR parameters. In one or more examples, the different types of PAwR parameters may include a number of subevent intervals (Num_Subevents); a subevent interval duration (Subevent_Interval), which may be a multiple of 1.25 milliseconds; a response slot delay (Response_Slot_Delay), which may be a number of idle time slots preceding the response slots; a number of response slots (Num_Response_Slots), such as per subevent interval; and a response slot spacing (Response_Slot_Spacing), which may be a multiple of 0.625 milliseconds. In one or more examples, the PAwR parameters may include more or less number, and/or different types of PAwR parameters, than as shown in table 800 of FIG. 8. When comparing the values within the old PAwR parameters (PAwR_OLD) column 820 with the values within the new PAwR parameters (PAwR_NEW) column 830, it is evident that the subevent interval duration (Subevent_Interval) may be larger for the new PAwR parameters than for the old PAwR parameters, and the response slot spacing (Response_Slot_Spacing) may be larger for the new PAwR parameters than for the old PAwR parameters.

In one or more aspects, the systems and techniques may dynamically update the PAwR characteristics by utilizing a variable response slot duration without updating the other PAwR parameters. In one or more examples, the systems and techniques can provide a larger response payload size (e.g., to be able to accommodate the transmission of large data packets, such as data packets for an asymmetric crypto material exchange, which may include public keys with elliptic curve digital signature algorithm (ECDSA) signatures that are at least 64 bytes in size) by dynamically increasing the response slot duration for one or more wireless communication devices (e.g., peripheral devices, such as ESLs).

In one or more examples, if during a synchronization interval, a network device (e.g., a central device, such as an access point) wants to allocate a larger slot of time for response by one of the wireless communication devices (e.g., peripheral device, such as an ESL), the network device may change (e.g., update) the response slot duration for that particular wireless communication device (e.g., without updating the PAwR train parameters). In one or more examples, the network device can change the response slot duration by sending an operational code (opcode) indication of a plurality of specific slots of time that can be utilized by that wireless communication device to send data (e.g., including one or more data packets). After receiving this indication from the network device, the wireless communication device can transmit larger data packets during these specified slots of time. The network device can align its receiver timing with the specified slots of time to receive the one or more data packets transmitted from the wireless communication device.

Figure 9:
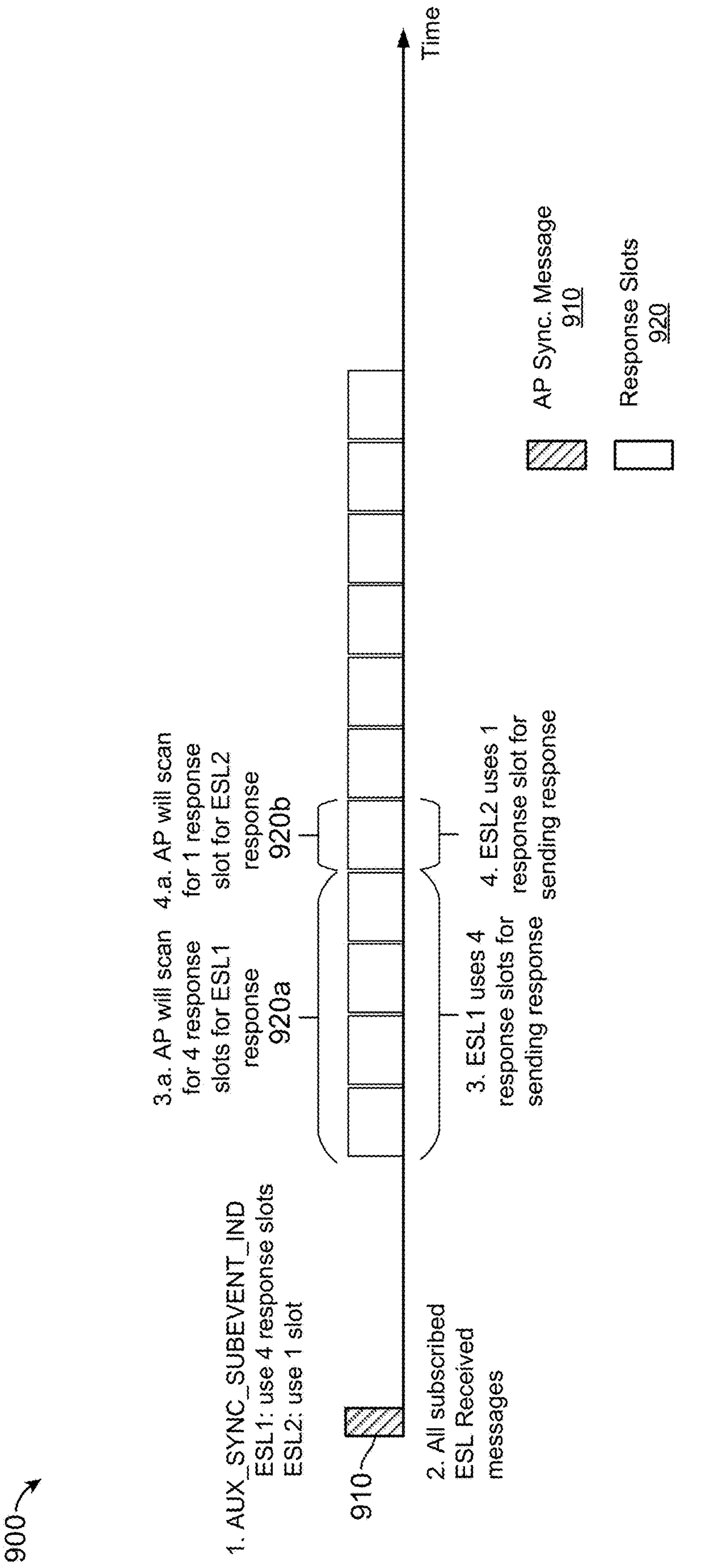
FIG. 9 is a diagram illustrating an example of a PAwR train with a variable slot duration, in accordance with some aspects of the present disclosure.

FIG. 9 shows an example of a network device (e.g., central device, such as an access point) dynamically updating a response slot duration for a wireless communication device (e.g., a peripheral device, such as a tag device, for example an ESL) without updating the other PAwR parameters. In particular, FIG. 9 is a diagram illustrating an example of a PAwR train 900 with a variable slot duration. In FIG. 9, the x-axis represents time. FIG. 9 shows an example of an update of a response slot duration for a first wireless communication device (e.g., ESL 1) of a group of wireless communication devices.

During a PA train, for an update of the response slot duration for the first wireless communication device (e.g., ESL 1), the network device (e.g., central device, such as an access point) can transmit (e.g., broadcast), within a subevent interval associated with the group of wireless communication devices, to the group of wireless communication devices (e.g., including ESL 1 and ESL 2), a signal 910 (e.g., a synchronization signal, such as an AUX_SYNC_SUBEVENT_IND). The signal 910 can indicate a plurality of response slots 920*a* of time (e.g., four slots) for transmission of data by the first wireless communication device (e.g., ESL 1) within the group of wireless communication devices. The signal 910 can also indicate a response slot 920*b* of time (e.g., one slot) for transmission of data by a second wireless communication device (e.g., ESL 2) within the group of wireless communication devices. In one or more examples, the signal 910 may include an opcode (e.g., which may be encrypted) to indicate to the wireless communication devices (e.g., including ESL 1 and ESL 2) the plurality of response slots 920*a* and the response slot 920*b* for transmissions. In some examples, a network entity (e.g., a management entity) may configure the opcode.

The wireless communication devices (e.g., ESL 1 and ESL 2) in the group of wireless communication devices are synchronized with the network device and, as such, can receive the signal 910 transmitted by the network device. After the network device transmits (e.g., broadcasts) the signal 910, the network device can align the timing of its receiver based on the plurality of response slots 920*a* of time and the response slot 920*b* of time.

After receiving the signal 910, the first wireless communication device (e.g., ESL 1) can transmit one or more data packets within the plurality of response slots 920*a*. The network device can scan during the plurality of response slots 920*a* to receive the one or more data packets transmitted from the first wireless communication device (e.g., ESL 1). The network device can then receive the one or more data packets transmitted from the first wireless communication device (e.g., ESL 1).

The second wireless communication device (e.g., ESL 2), after receiving the signal 910, can transmit one or more data packets within the response slot 920*b*. The network device can scan during the response slot 920*b* to receive the one or more data packets transmitted from the second wireless communication device (e.g., ESL 2). The network device can receive the one or more data packets transmitted from the second wireless communication device (e.g., ESL 2).

Figure 10A:
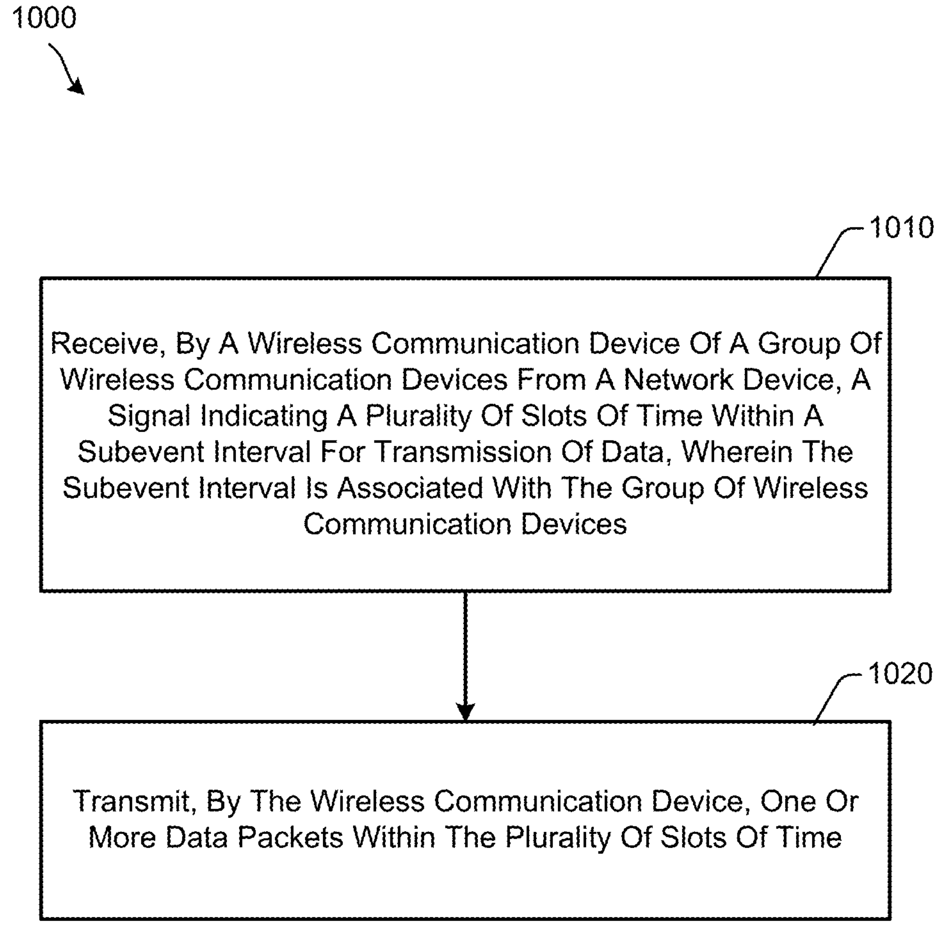
FIG. 10A is a flow diagram illustrating an example of a process for a dynamic PAwR update, in accordance with some aspects of the present disclosure.

FIG. 10A is a flow chart illustrating an example of a process 1000 for wireless communication, such as to provide a dynamic PAwR update. The process 1000 can be performed by a wireless communication device (e.g., wireless communication device 120 of FIG. 1, device 200 of FIG. 2, devices 1-5 305*a*-305*e* of FIG. 3, wireless network devices 420*a*, 420*b* of FIG. 4, peripheral 620 of FIG. 6, the ESL1 of FIG. 9, the computing system 1100 of FIG. 11, or other wireless communication device) or by a component or system (e.g., a chipset) of the wireless communication device. In some examples, the wireless communication device is a peripheral device, such as a tag device. The operations of the process 1000 may be implemented as software components that are executed and run on one or more processors (e.g., processor 1110 of FIG. 11 or other processor(s)). Further, the transmission and reception of signals by the wireless communications device in the process 1000 may be enabled, for example, by one or more antennas and/or one or more transceivers (e.g., wireless transceiver(s)).

At block 1010, the wireless communication device (or component thereof) can receive, from a network device (e.g., an access point (AP) or other network device), a signal (e.g., signal 910 of FIG. 9) indicating a plurality of slots of time (e.g., corresponding to a number of response slots) within a subevent interval for transmission of data. In some aspects, the signal is a synchronization signal. The subevent interval is associated with a group of wireless communication devices that includes the wireless communication device. In some cases, the subevent interval is within a frame of a periodic advertisement with response (PAwR) train. In one illustrative example, the signal comprises an operational code (opcode) indicating the plurality of slots of time. In some cases, the opcode is configured by a network entity (e.g., a management entity (ME), such as the ME 130 of FIG. 1). In some examples, the opcode or one or more other opcodes can include other information, such as a hopping frequency sequence (HFS), a connection interval, a maximum payload of a request, a maximum payload of a response, any combination thereof, and/or other information.

In some aspects, the signal can also indicate a slot of time, within the subevent interval associated with the group of wireless communication devices, for transmission of data by another wireless communication device (e.g., ESL2 of FIG. 9) of the group of wireless communication devices.

At block 1020, the wireless communication device (or component thereof) can transmit (or output for transmission) one or more data packets within the plurality of slots of time.

Figure 10B:
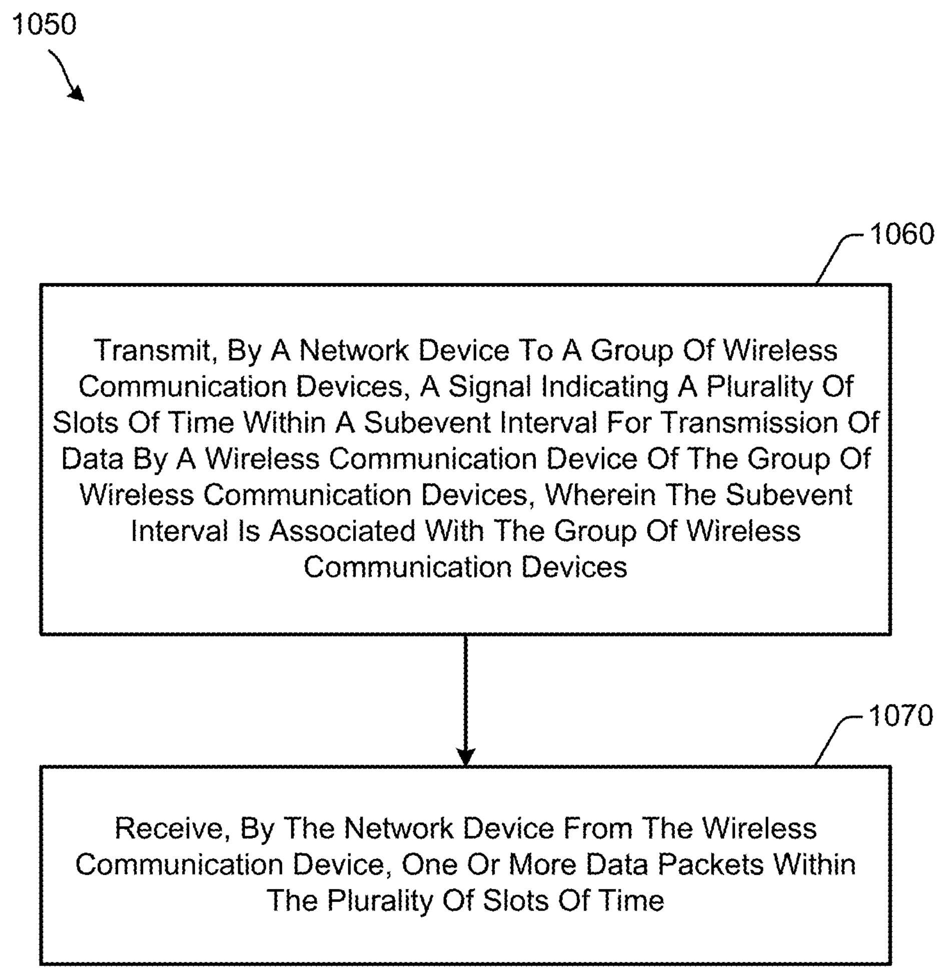
FIG. 10B is a flow diagram illustrating another example of a process for a dynamic PAwR update, in accordance with some aspects of the present disclosure.

FIG. 10B is a flow chart illustrating an example of a process 1050 for wireless communication, such as to provide a dynamic PAwR update. The process 1050 can be performed by a network device (e.g., the access point 110 of FIG. 1, the access point 410 of FIG. 4, the central 610 of FIG. 6, the computing system 1100 of FIG. 11, or other network device) or by a component or system (e.g., a chipset) of the wireless communication device. The operations of the process 1050 may be implemented as software components that are executed and run on one or more processors (e.g., processor 1110 of FIG. 11 or other processor(s)). Further, the transmission and reception of signals by the wireless communications device in the process 1050 may be enabled, for example, by one or more antennas and/or one or more transceivers (e.g., wireless transceiver(s)).

At block 1060, the network device (or component thereof) can transmit (or output for transmission), to a group of wireless communication devices, a signal indicating a plurality of slots of time within a subevent interval for transmission of data by a wireless communication device (e.g., ESL1 of FIG. 9) of the group of wireless communication devices. In some aspects, the signal is a synchronization signal. The subevent interval is associated with the group of wireless communication devices. In some cases, the subevent interval is within a frame of a PAwR train. In one illustrative example, the signal comprises an operational code (opcode) indicating the plurality of slots of time. In some cases, the opcode is configured by a network entity (e.g., a management entity (ME), such as the ME 130 of FIG. 1). In some examples, the opcode or one or more other opcodes can include other information, such as a hopping frequency sequence (HFS), a connection interval, a maximum payload of a request, a maximum payload of a response, any combination thereof, and/or other information. In some cases, the wireless communication devices are peripheral devices, such as tag devices.

In some aspects, the signal can also indicate a slot of time, within the subevent interval associated with the group of wireless communication devices, for transmission of data by another wireless communication device (e.g., ESL2 of FIG. 9) of the group of wireless communication devices.

At block 1070, the network device (or component thereof) can receive, from the wireless communication device, one or more data packets within the plurality of slots of time. In some aspects, the network device (or component thereof) can align timing of a receiver of the network device based on the plurality of slots of time. In some cases, the network device (or component thereof) can scan during the plurality of slots of time for receiving transmissions from the wireless communication device.

In some examples, the process 1000 may be performed by one or more computing devices or apparatuses. In some illustrative examples, the process 1000 can be performed by wireless communication device 120 of FIG. 1, device 200 of FIG. 2, devices 1-5 305*a*-305*e* of FIG. 3, wireless network devices 420*a*, 420*b* of FIG. 4, peripheral 620 of FIG. 6, and/or one or more computing devices or systems (e.g., the computing system 1100 of FIG. 11). In some cases, such a computing device or apparatus may include a processor, microprocessor, microcomputer, or other component of a device that is configured to carry out the steps of the process 1000. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1000 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
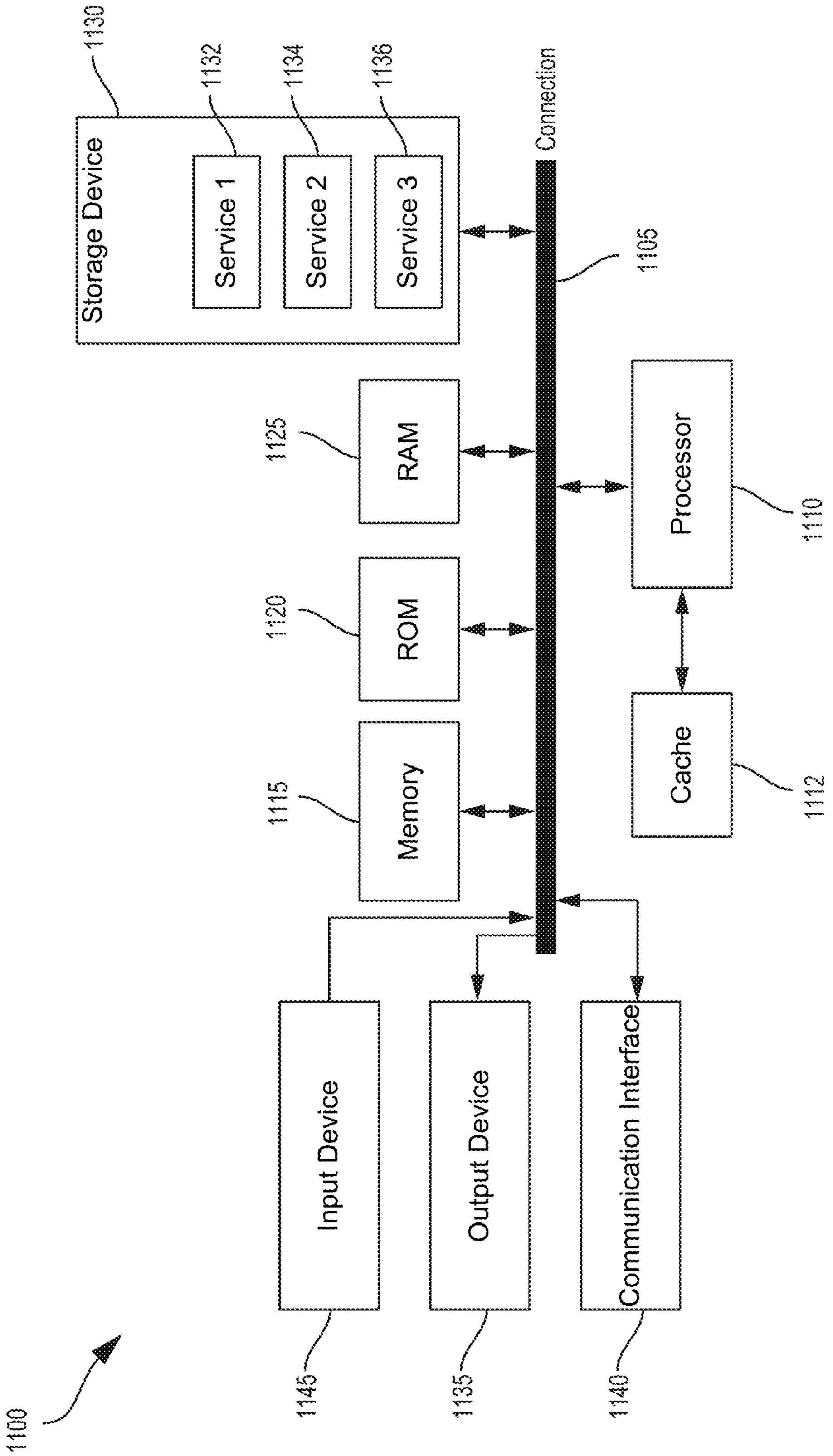
FIG. 11 is a diagram illustrating an example of a system for implementing certain aspects described herein.

FIG. 11 is a block diagram illustrating an example of a computing system 1100, which may be employed by the disclosed system for a dynamic PAwR update. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100.

Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more range sensors (e.g., LIDAR sensors, laser range finders, RF radars, ultrasonic sensors, and infrared (IR) sensors) configured to collect data and provide measurements to processor 1110, whereby processor 1110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/ pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A wireless communication device for wireless communication, the wireless communication device comprising: at least one memory; and at least one processor coupled to the at least one memory and configured to: receive, from a network device, a signal indicating a plurality of slots of time within a subevent interval for transmission of data, wherein the subevent interval is associated with a group of wireless communication devices that includes the wireless communication device; and output one or more data packets for transmission within the plurality of slots of time.

Aspect 2. The wireless communication device of Aspect 1, wherein the subevent interval is within a frame of a periodic advertisement with response (PAwR) train.

Aspect 3. The wireless communication device of any one of Aspects 1 or 2, wherein the signal comprises an operational code (opcode) indicating the plurality of slots of time.

Aspect 4. The wireless communication device of Aspect 3, wherein the opcode is configured by a network entity.

Aspect 5. The wireless communication device of any one of Aspects 1 to 4, wherein the signal further indicates a slot of time, within the subevent interval associated with the group of wireless communication devices, for transmission of data by another wireless communication device of the group of wireless communication devices.

Aspect 6. The wireless communication device of any one of Aspects 1 to 5, wherein the signal is a synchronization signal.

Aspect 7. The wireless communication device of any one of Aspects 1 to 6, wherein the wireless communication device is a tag device.

Aspect 8. The wireless communication device of any one of Aspects 1 to 7, wherein the network device is an access point (AP).

Aspect 9. A method of wireless communication performed at a wireless communication device, the method comprising: receiving, by the wireless communication device of a group of wireless communication devices from a network device, a signal indicating a plurality of slots of time within a subevent interval for transmission of data, wherein the subevent interval is associated with the group of wireless communication devices; and transmitting, by the wireless communication device, one or more data packets within the plurality of slots of time.

Aspect 10. The method of Aspect 9, wherein the subevent interval is within a frame of a periodic advertisement with response (PAwR) train.

Aspect 11. The method of any one of Aspects 9 or 10, wherein the signal comprises an operational code (opcode) indicating the plurality of slots of time.

Aspect 12. The method of Aspect 11, wherein the opcode is configured by a network entity.

Aspect 13. The method of any one of Aspects 9 to 12, wherein the signal further indicates a slot of time, within the subevent interval associated with the group of wireless communication devices, for transmission of data by another wireless communication device of the group of wireless communication devices.

Aspect 14. The method of any one of Aspects 9 to 13, wherein the signal is a synchronization signal.

Aspect 15. The method of any one of Aspects 9 to 14, wherein the wireless communication device is a tag device.

Aspect 16. The method of any one of Aspects 9 to 15, wherein the network device is an access point (AP).

Aspect 17. A network device for wireless communication, the network device comprising: at least one memory; and at least one processor coupled to the at least one memory and configured to: output, for transmission to a group of wireless communication devices, a signal indicating a plurality of slots of time within a subevent interval for transmission of data by a wireless communication device of the group of wireless communication devices, wherein the subevent interval is associated with the group of wireless communication devices; and receive, from the wireless communication device, one or more data packets within the plurality of slots of time.

Aspect 18. The network device of Aspect 17, wherein the at least one processor is configured to align timing of a receiver of the network device based on the plurality of slots of time.

Aspect 19. The network device of any one of Aspects 17 or 18, wherein the at least one processor is configured to scan during the plurality of slots of time for receiving transmissions from the wireless communication device.

Aspect 20. The network device of any one of Aspects 17 to 19, wherein the subevent interval is within a frame of a periodic advertisement with response (PAwR) train.

Aspect 21. The network device of any one of Aspects 17 to 20, wherein the signal comprises an operational code (opcode) indicating the plurality of slots of time.

Aspect 22. The network device of Aspect 21, wherein the opcode is configured by a network entity.

Aspect 23. The network device of any one of Aspects 17 to 22, wherein the signal further indicates a slot of time, within the subevent interval associated with the group of wireless communication devices, for transmission of data by another wireless communication device of the group of wireless communication devices.

Aspect 24. The network device of any one of Aspects 17 to 23, wherein the signal is a synchronization signal.

Aspect 25. The network device of any one of Aspects 17 to 24, wherein the wireless communication device is a tag device.

Aspect 26. The network device of any one of Aspects 17 to 25, wherein the network device is an access point (AP).

Aspect 27. A method of wireless communication performed at a network device, the method comprising: transmitting, by the network device to a group of wireless communication devices, a signal indicating a plurality of slots of time within a subevent interval for transmission of data by a wireless communication device of the group of wireless communication devices, wherein the subevent interval is associated with the group of wireless communication devices; and receiving, by the network device from the wireless communication device, one or more data packets within the plurality of slots of time.

Aspect 28. The method of Aspect 27, further comprising aligning, by the network device, timing of a receiver of the network device based on the plurality of slots of time.

Aspect 29. The method of any one of Aspects 27 or 28, further comprising scanning, by the network device, during the plurality of slots of time for receiving transmissions from the wireless communication device.

Aspect 30. The method of any one of Aspects 27 to 29, wherein the subevent interval is within a frame of a periodic advertisement with response (PAwR) train.

Aspect 31. The method of any one of Aspects 27 to 30, wherein the signal comprises an operational code (opcode) indicating the plurality of slots of time.

Aspect 32. The method of Aspect 31, wherein the opcode is configured by a network entity.

Aspect 33. The method of any one of Aspects 27 to 32, wherein the signal further indicates a slot of time, within the subevent interval associated with the group of wireless communication devices, for transmission of data by another wireless communication device of the group of wireless communication devices.

Aspect 34. The method of any one of Aspects 27 to 33, wherein the signal is a synchronization signal.

Aspect 35. The method of any one of Aspects 27 to 34, wherein the wireless communication device is a tag device.

Aspect 36. The method of any one of Aspects 27 to 35, wherein the network device is an access point (AP).

Aspect 37. A non-transitory computer-readable medium having stored thereon instructions that, when executed by one or more processors, cause the one or more processors to perform operations according to any of Aspects 9 to 16.

Aspect 38. An apparatus including one or more means for performing operations according to any of Aspects 9 to 16.

Aspect 39. A non-transitory computer-readable medium having stored thereon instructions that, when executed by one or more processors, cause the one or more processors to perform operations according to any of Aspects 27 to 36.

Aspect 40. An apparatus including one or more means for performing operations according to any of Aspects 27 to 36.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A wireless communication device for wireless communication, the wireless communication device comprising:

at least one memory; and at least one processor coupled to the at least one memory and configured to:

receive, from a network device, a signal indicating a number of a plurality of slots of time within a subevent interval of a frame for transmission of data, the frame comprising a plurality of subevent intervals that includes the subevent interval, wherein each of the plurality of subevent intervals is associated with a respective group of wireless communication devices from a plurality of wireless communication devices, and wherein the subevent interval is associated with a group of wireless communication devices from the plurality of wireless communication devices that includes the wireless communication device; and output one or more data packets for transmission within the plurality of slots of time.

2. The wireless communication device of claim 1, wherein the subevent interval is within a frame of a periodic advertisement with response (PAwR) train.

3. The wireless communication device of claim 1, wherein the signal comprises an operational code (opcode) indicating the plurality of slots of time.

4. The wireless communication device of claim 3, wherein the opcode is configured by a network entity.

5. The wireless communication device of claim 1, wherein the signal further indicates a slot of time, within the subevent interval associated with the group of wireless communication devices, for transmission of data by another wireless communication device of the group of wireless communication devices.

6. The wireless communication device of claim 1, wherein the signal is a synchronization signal.

7. The wireless communication device of claim 1, wherein the wireless communication device is a tag device.

8. The wireless communication device of claim 1, wherein the network device is an access point (AP).

9. The wireless communication device of claim 1, wherein the signal further indicates a duration of one of the plurality of slots of time within the subevent interval of the frame that differs from a duration of another slot of time within the subevent interval of the frame.

10. A method of wireless communication performed at a wireless communication device, the method comprising:

receiving, by the wireless communication device of a group of wireless communication devices from a plurality of wireless communication devices from a network device, a signal indicating a number of a plurality of slots of time within a subevent interval of a frame for transmission of data, the frame comprising a plurality of subevent intervals that includes the subevent interval, wherein each of the plurality of subevent intervals is associated with a respective group of wireless communication devices from the plurality of wireless communication devices, and wherein the subevent interval is associated with the group of wireless communication devices from the plurality of wireless communication devices; and transmitting, by the wireless communication device, one or more data packets within the plurality of slots of time.

11. The method of claim 10, wherein the subevent interval is within a frame of a periodic advertisement with response (PAwR) train.

12. The method of claim 10, wherein the signal comprises an operational code (opcode) indicating the plurality of slots of time.

13. The method of claim 12, wherein the opcode is configured by a network entity.

14. The method of claim 10, wherein the signal further indicates a slot of time, within the subevent interval associated with the group of wireless communication devices, for transmission of data by another wireless communication device of the group of wireless communication devices.

15. The method of claim 10, wherein the signal is a synchronization signal.

16. The method of claim 10, wherein the signal further indicates a duration of one of the plurality of slots of time within the subevent interval of the frame that differs from a duration of another slot of time within the subevent interval of the frame.

17. A network device for wireless communication, the network device comprising:

at least one memory; and at least one processor coupled to the at least one memory and configured to:

output, for transmission to a group of wireless communication devices from a plurality of wireless communication devices, a signal indicating a number of a plurality of slots of time within a subevent interval of a frame for transmission of data by a wireless communication device of the group of wireless communication devices from the plurality of wireless communication devices, the frame comprising a plurality of subevent intervals that includes the subevent interval, wherein each of the plurality of subevent intervals is associated with a respective group of wireless communication devices from the plurality of wireless communication devices, and wherein the subevent interval is associated with the group of wireless communication devices from the plurality of wireless communication devices; and receive, from the wireless communication device, one or more data packets within the plurality of slots of time.

18. The network device of claim 17, wherein the at least one processor is configured to align timing of a receiver of the network device based on the plurality of slots of time.

19. The network device of claim 17, wherein the at least one processor is configured to scan during the plurality of slots of time for receiving transmissions from the wireless communication device.

20. The network device of claim 17, wherein the subevent interval is within a frame of a periodic advertisement with response (PAwR) train.

21. The network device of claim 17, wherein the signal comprises an operational code (opcode) indicating the plurality of slots of time.

22. The network device of claim 21, wherein the opcode is configured by a network entity.

23. The network device of claim 17, wherein the signal further indicates a slot of time, within the subevent interval associated with the group of wireless communication devices, for transmission of data by another wireless communication device of the group of wireless communication devices.

24. The network device of claim 17, wherein the signal is a synchronization signal.

25. The network device of claim 17, wherein the signal further indicates a duration of one of the plurality of slots of time within the subevent interval of the frame that differs from a duration of another slot of time within the subevent interval of the frame.

26. A method of wireless communication performed at a network device, the method comprising:

transmitting, by the network device to a group of wireless communication devices from a plurality of wireless communication devices, a signal indicating a number of a plurality of slots of time within a subevent interval of a frame for transmission of data by a wireless communication device of the group of wireless communication devices from the plurality of wireless communication devices, the frame comprising a plurality of subevent intervals that includes the subevent interval, wherein each of the plurality of subevent intervals is associated with a respective group of wireless communication devices from the plurality of wireless communication devices, and wherein the subevent interval is associated with the group of wireless communication devices from the plurality of wireless communication devices; and receiving, by the network device from the wireless communication device, one or more data packets within the plurality of slots of time.

27. The method of claim 26, further comprising aligning, by the network device, timing of a receiver of the network device based on the plurality of slots of time.

28. The method of claim 26, further comprising scanning, by the network device, during the plurality of slots of time for receiving transmissions from the wireless communication device.

29. The method of claim 26, wherein the subevent interval is within a frame of a periodic advertisement with response (PAwR) train.

30. The method of claim 26, wherein the signal further indicates a duration of one of the plurality of slots of time within the subevent interval of the frame that differs from a duration of another slot of time within the subevent interval of the frame.

* * * * *